Dec. 30, 1958 W. W. SALISBURY 2,866,917
ELECTROMAGNETIC WAVE GENERATOR
Filed Sept. 8, 1955 3 Sheets-Sheet 1
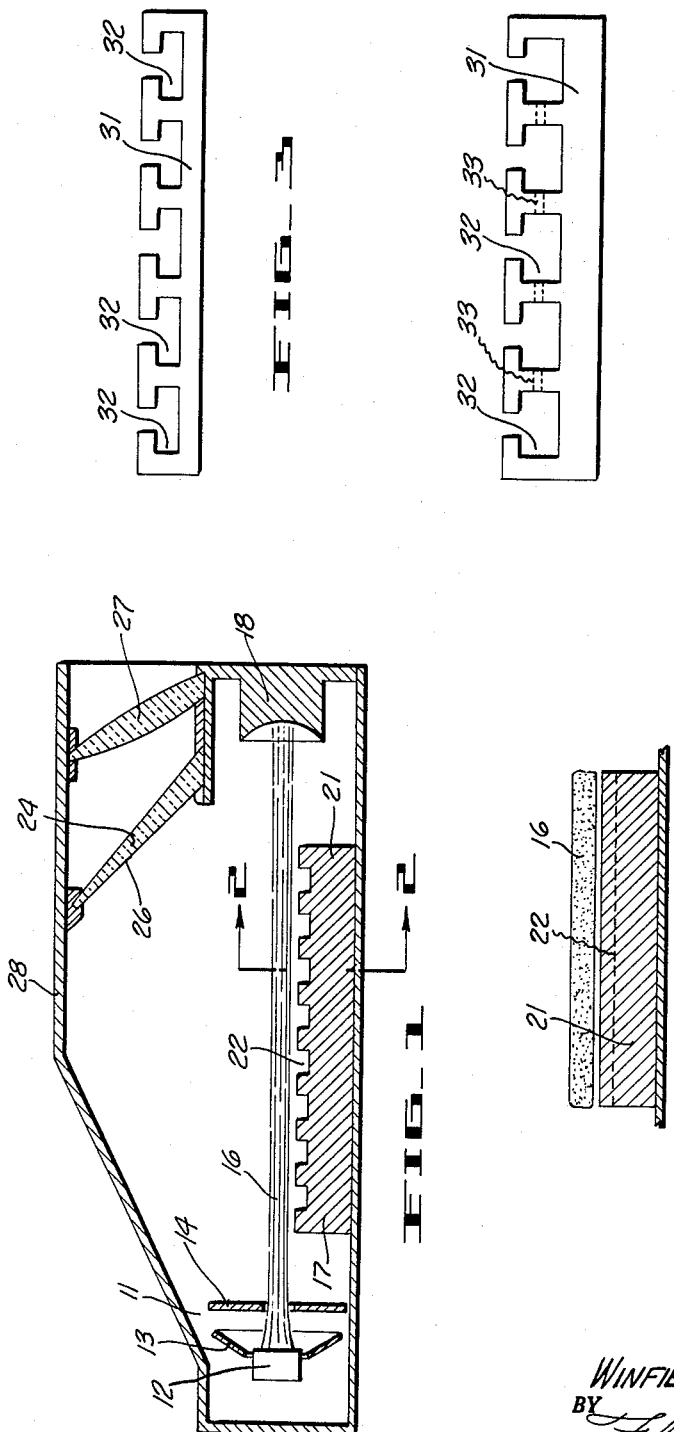
INVENTOR.
WINFIELD W. SALISBURY
BY
ATTORNEYS Dec. 30, 1958 W. W. SALISBURY 2,866,917
ELECTROMAGNETIC WAVE GENERATOR
Filed Sept. 8, 1955 3 Sheets-Sheet 2
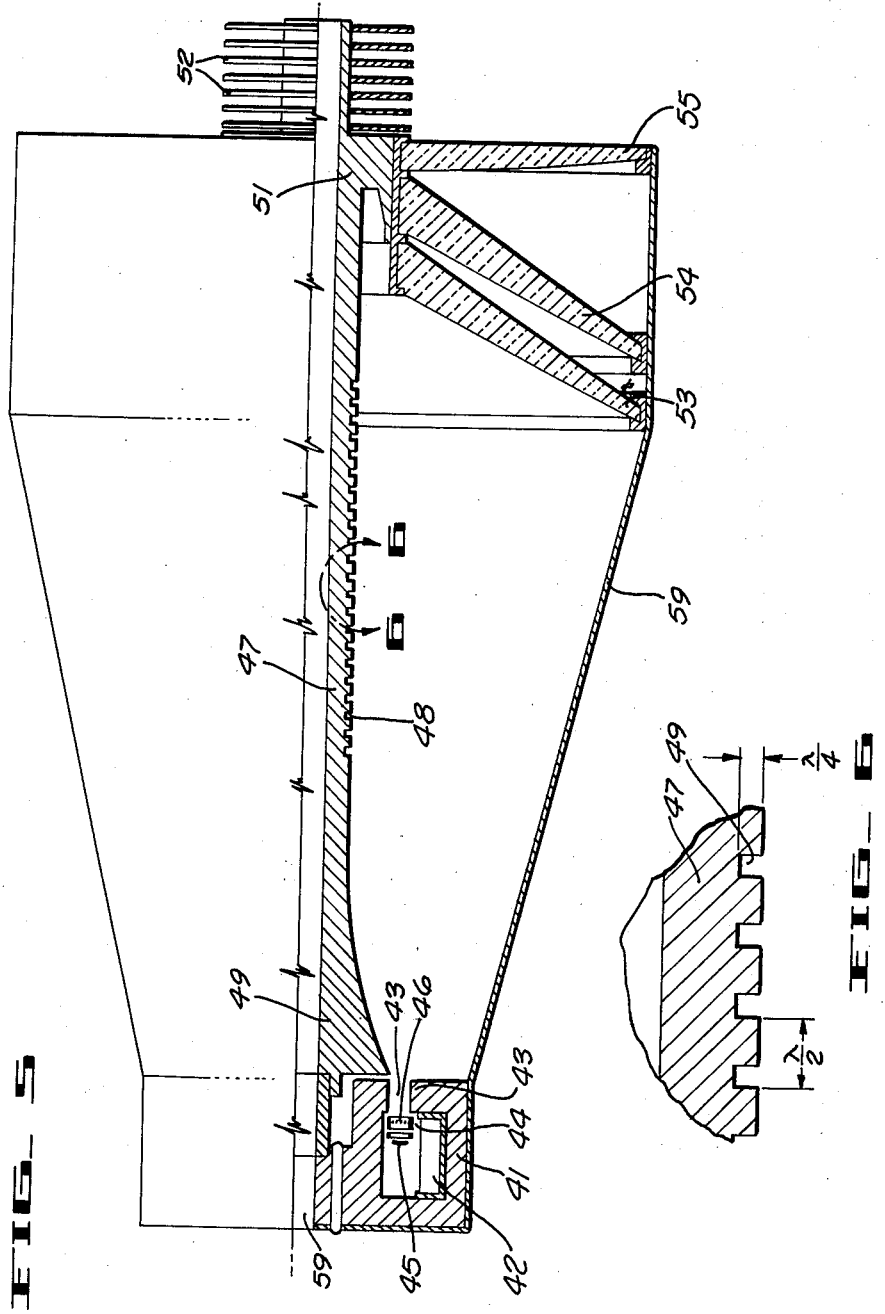
INVENTOR.
WINFIELD W. SALISBURY
BY
ATTORNEYS

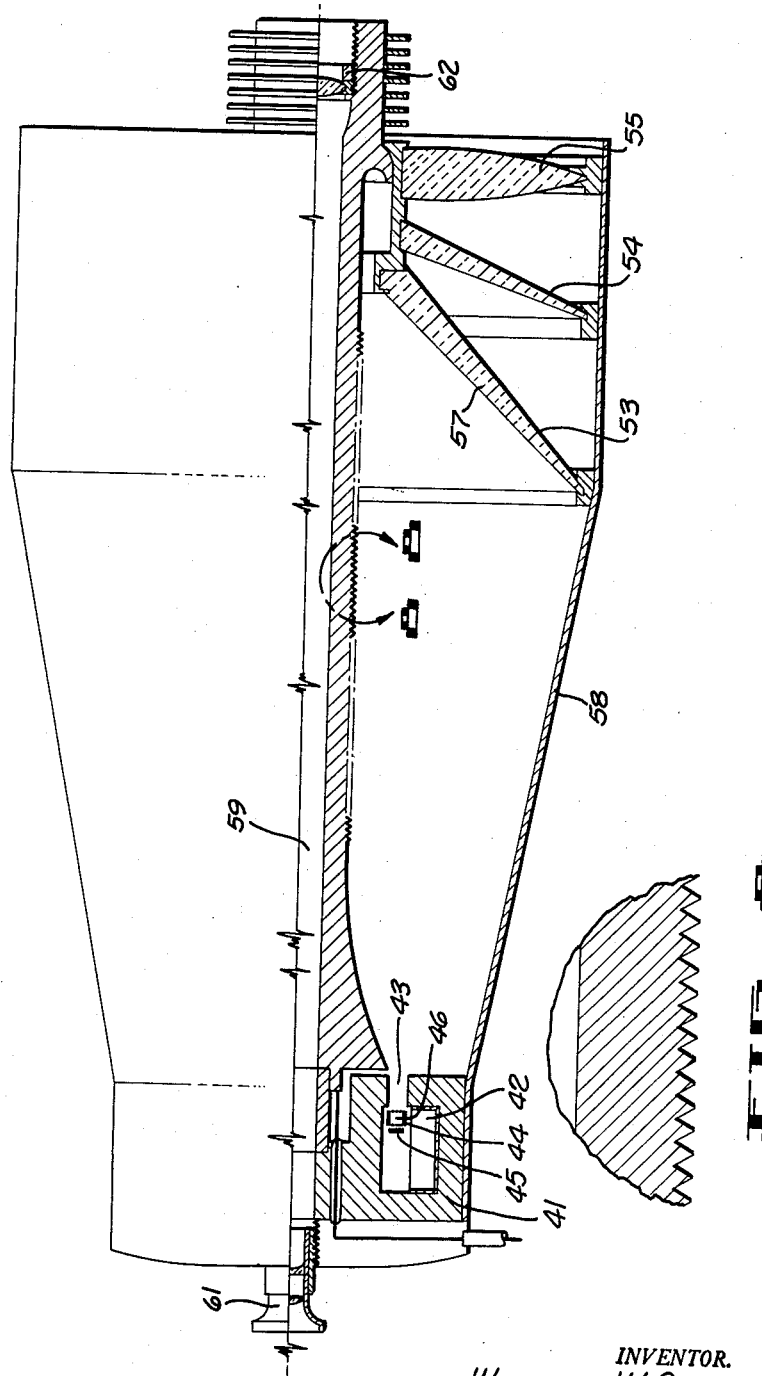

United States Patent Office 2,866,917
Patented Dec. 30, 1958

2,866,917

ELECTROMAGNETIC WAVE GENERATOR

Winfield W. Salisbury, Lafayette, Calif., assignor, by mesne assignments, to Zenith Radio Corporation, a corporation of Delaware Application September 8, 1955, Serial No. 533,098

9 Claims. (Cl. 315—4)

This invention relates generally to electromagnetic wave generators, and more particularly to an electromagnetic wave generator of the type which operates by interaction of an electron stream with an electromagnetic field.

It is a general object of the present invention to provide an electromagnetic wave generator in which an electron stream interacts with an electromagnetic field to produce oscillation and radiation coherently over an area of many square wavelengths.

It is an object of the present invention to provide an electromagnetic wave generator of super high frequencies and higher.

It is a further object of the present invention to provide an electromagnetic wave generator for producing radiation in the visible and infra-red regions of the spectrum.

It is another object of the present invention to provide an electromagnetic wave generator which produces an electromagnetic beam.

It is a further object of the present invention to provide an electromagnetic wave generator in which the radiation may be focused to produce a pattern having a predetermined intensity.

It is still a further object of the present invention to provide an electromagnetic wave generator in which the energy may be focused to produce a pattern having an intensity which is greater than that of the radiating source.

It is a further object of the present invention to provide an electromagnetic wave generator of the above character which operates with high efficiency.

These and other objects of the invention will become more apparent from the following description and accompanying drawings.

Referring to the drawings:

Figure 1 is a schematic elevational view of apparatus which incorporates my invention;

Figure 2 is a sectional view taken along the line 2—2 of Figure 1;

Figure 3 is a schematic view of an electrical structure which may be employed in the apparatus of Figure 1;

Figure 4 is a schematic view of an electrical structure of the type shown in Figure 3, but which includes means for coupling the elements together;

Figure 5 is an elevational view partly in section of another electromagnetic wave generator;

Figure 6 shows an enlarged view of the portion 6—6 of Figure 5;

Figure 7 is an elevational view of an electromagnetic wave generator suitable for radiating energy in the infrared region of the spectrum;

Figure 8 shows an enlarged view of the portion 8—8 of Figure 7.

It is well known that electrical structures may be designed to produce travelling electromagnetic waves having phase and group velocities of various values. For example, a series of resonance slots or open-ended cavities coupled together by means of their stray fields are capable of supporting travelling electromagnetic waves. The waves are capable of supporting phase velocities which are greater than the velocity of light in free space.

It is also well known that an electromagnetic stream may be considered a moving ionosphere. Such a stream is capable of supporting magneto-hydronamic or space charge waves having phase velocities with respect to a stationary system which are greater than the velocity of light.

Assume an electron stream moving adjacent an electrical structure which produces a travelling electromagnetic wave. Assume further that the wave has a phase velocity which is near that of the electron stream. At various points along the wave, the electric field components of the wave will alternate in direction, tending to accelerate the electrons in the stream, and a half wavelength later tending to decelerate the electrons. Electrons moving along with the accelerating fields will speed up with respect to the mean velocity of the stream while those which are moving in regions of decelerating fields will tend to slow down. The net effect is bunching of the electrons.

If the electron stream is travelling with a phase velocity which is slightly greater than the phase velocity of the electromagnetic wave, the electron bunches in the stream will eventually move towards regions of decelerating field. The average effect produced is one of slowing down the stream. Thus the stream looses kinetic energy. This energy is transferred to the electromagnetic wave and amplifies the wave.

The energy which is transferred to the electromagnetic wave is in effect transferred to the slots, cavities or other configuration of the electrical structure and serves to build up their stray fields. The slots, cavities, etc. of the electrical structure radiate into free space. The radiation angle is such that the projection of the phase velocity vector on that angle is equal to the velocity of light.

The frequency of the radiated energy depends upon the velocity of the electron stream, the configuration of the electrical structure, and the mode which is being excited.

The cavities or slots may degenerate into mere scratches like those on a diffraction grating. In this case, the direction of radiation is the same as that of the first order spectrum for the grating at the wavelength produced.

If the coupling between the various configurations which form the electrical structure is insufficient, it may be increased by suitable means. For example, slots or holes may be employed to couple the resonators or cavities together. The slots or holes serve not only to increase the coupling, but also to control the group and phase velocities of the electromagnetic wave.

The Q of the system may be increased by providing means for intensifying the standing wave pattern at the operating frequency. This is achieved by placing a partial reflector perpendicular to the direction of radiation to set up standing waves.

The radiation produced by a system of the above character is in phase along the radiation wave front and is therefore coherent radiation as contrasted with radiation from a thermal source such as a heated black body which produces incoherent radiation. As is well known, solar radiation is also incoherent radiation. Although incoherent radiation may be focused, the intensity of the image may never be greater than the intensity of the source. With coherent radiation, the radiation may be concentrated into a small image which is more intense than the radiating surface by the ratio of the area of the source to the area of the image. Theoretically the limiting reduced size of the image is $$\frac{\lambda}{2}$$

Practically, the limiting size of the image is determined by the diffraction effect of the size of the surface of origin measured in wavelengths, provided that no smaller aperture intervenes to intercept the parallel rays.

Referring now to the drawings, I have shown electrical structures which are capable of supporting travelling electromagnetic waves having phase and group velocities of various values. An electron stream is projected adjacent the structure and interacts with the wave. Energy is transferred from the electron stream to the structure. Coherent radiation is produced and is radiated at an angle which depends upon the frequency of operation. A partial reflector serves to increase the Q of the system. A lens system directs the energy into a desired pattern.

Referring particularly to Figures 1 and 2, an electromagnetic wave generator is schematically shown. The electron gun 11 having a cathode 12 and electrodes 13 and 14 serves to project a parallel electron stream 16. The stream passes adjacent the electrical structure 17, to be presently described, and is intercepted by the collector 18. A suitable gun is described in Pierce, Theory and Design of Electron Beams, D. Van Nostrand Company, Inc., 1954, pages 173-180.

The electrical structure 17 comprises a plate 21 having parallel slots 22 formed therein. The slots are spaced whereby the stray fields couple the slots together. The structure supports a travelling electromagnetic wave. As is well known, slots of this type have resonant frequencies which are dependent upon their dimensions. The stream 16 is projected adjacent the structure 17. It passes through the stray fields to interact therewith and transfer energy to the slots 22.

As previously described, energy is radiated at an angle. To increase the Q of the system, a partially reflecting surface is placed in the path of the radiation and perpendicular thereto. This sets up standing waves at the operating frequency. Thus, the lens 24 has a surface 26 which is partially reflecting. A portion of the radiation is reflected to increase the magnitude of the standing waves while the remainder of the radiation passes through the lens and is focused thereby. A second lens 27 is employed to further focus the energy to provide an image of desired size at a predetermined distance. It is apparent that by properly selecting the lenses 24 or 27 or by varying their positions, it is possible to control the size and location of the image. It is to be understood that although I have described a particular lens system, any suitable lens system may be employed.

The electron gun, collector, electrical structure and lens system are enclosed in an evacuated envelope. Such an envelope is shown schematically at 28.

It is apparent that by properly selecting the dimensions of the slots 22 the radiation frequency may be controlled. As previously described, the velocity of the electron beam 16 must be such that the phase velocity of the electron stream is slightly greater than the phase velocity of the travelling electromagnetic wave supported by the structure 17.

In Figure 3 I have shown an electrical structure 31 which is resonant at lower frequencies than that shown in Figure 1. A series of resonant cavities 32 are shown coupled together by means of their stray fields.

In certain instances, stray field coupling is not sufficient to support a travelling wave. In such cases, suitable means may be employed to couple the slots 32. For example, holes 33, Figure 4, serve to increase the coupling. These holes also serve to control the modes which are propagated by the electrical structure. It is apparent that other means for coupling, such as slots formed on the upper edge of the structure, may be employed.

In Figure 5 I have shown an electromagnetic wave generator which employs an electrical structure which is cylindrical in form. A hollow electron beam interacts with the electromagnetic wave supported by the structure. The generator shown employs radial electrical field focusing of the electron stream. An annular magnetic structure 41 has a coil 42 wound thereon. The structure 41 has a magnetic field gap 43. A radial magnetic field is formed across the gap 43 through which the electrons pass. An annular electron gun 44 serves to produce the hollow electron stream. For example, the gun may comprise an annular cathode 45 with annular grid elements 46. The electron stream is then accelerated and passes through the radial magnetic field where it acquires a rotational velocity. The stream then enters into a region of radial electric focusing.

The radial electric field arises from two sources: the charge on the cylindrical electrodes and the space charge. This field balances the centrifugal force to maintain the electrons in a cylindrical path as they travel adjacent the electrical structure. Radial electric field focusing is described in detal in Fundamentals of Electronic Motion. McGraw-Hill, 1953, pages 160-163. It is of course to be understood that magnetic focusing may be employed. The formation of hollow beams in this manner is well known and is described in the above references.

The electrical structure shown in 47 is provided with a series of resonance slots 48. These slots are formed annularly about the structure. For ease of manufacture, these slots may be formed helically. The electrical structure 47 has an enlarged portion 49 which forms a continuation of the electron gun structure. A collector 51 is formed on the other end of the structure. Cooling fins 52 are provided for dissipating the heat produced by the electrons striking the collector.

The hollow electron stream travels adjacent the electrical structure 47 and interacts with the travelling electromagnetic wave.

A lens system is employed for focusing the energy which is radiated by the electrical structure. The lens system may comprise any suitable number of lenses and may be adjustable to control the focal distance and size of image. For example, the structure may comprise annular lenses 53, 54 and 55. The lens 53 has the surface 57 coated whereby a portion of the radiated energy is reflected to increase the Q of the system. The surface 57 is placed perpendicular to the direction of radiation. The complete structure is enclosed in an evacuated metallic envelope 58. The cylindrical electrical structure 47 and the outer envelope 58 are appropriately charged to produce the desired focusing field.

If desired, the electrical structure 47 may be hollow, as shown at 59. The electromagnetic wave generator may then be sighted through this opening.

The beam formed will be a hollow beam. The frequency of the radiation will depend upon the resonant frequency of the slot or cavities. The point of focus will depend upon the focal length of the various lenses. The intensity of the image will depend upon the relative area of the radiating surface and image.

It is of course apparent that although dielectric lenses are shown, it is possible to use delayed type lens or other suitable lenses for focusing the energy. The choice of lens will depend upon the wavelength which is being radiated.

In Figure 7, another electromagnetic wave generator is shown. The construction of this electromagnetic wave generator is similar to that shown in Figure 5, and like reference numbers refer to like parts. The electrical structure includes resonant grooves which may be in the form of threads. The resonant frequencies of such grooves will be higher than the resonant frequency of the cavities shown in Figure 5. Thus, the wavelength of the energy radiated will be shorter. If the slots are made very small or degenerate into a grating, the energy which is radiated may lie in the infra-red or visible region of the spectrum.

In the embodiment shown in Figure 7, the hollow portion 59 is provided with an eye piece 61 and an object lens 62. Thus, it is possible to sight the electromagnetic wave generator in the same manner one would sight a rifle with a telescopic sight.

I have described planar and cylindrical structures which serve to support the electromagnetic wave. It should be understood that the structure may take other forms. The electron stream should be designed to pass adjacent as much of the surface of the structure as possible for maximum radiation. For example, it may be desirable in certain instances to design a structure having a truncated conical shape.

The electromagnetic wave generator has many uses. A few uses will be enumerated, others are apparent. For example, in radar, it is desirable to project an intense electromagnetic beam. The generator may be designed to radiate energy at any desired wavelength. By appropriately choosing the shape and surface area of the electrical structure and of the lens system, it is possible to project a beam having a desired cross-sectional area and the desired intensity. Expensive reflectors, oscillators, etc., are eliminated.

The generator may be designed to radiate energy having frequencies which lie within the infra-red region of the spectrum. The energy of translation of an electron stream is converted into heat energy. It may be used to supply infra-red energy to drying chambers. A very important use is in the drying of suspended particles. With the apparatus of my invention, the heat rays could be concentrated in the critical area of spray drying equipment. The generator may serve to provide monachromatic radiation for spectroscopic studies.

Another application would be to apply intense heat to objects which are located at great distances. With proper design, heat equivalent to many acetelyne torches may be projected and confined to a small area. The energy is transferred from the generator to the object at the speed of light.

I claim:

1. A super-high-frequency electromagnetic wave generator comprising: a conductive element having an extended surface of an area whose dimensions in a pair of coordinate directions are large relative to a predetermined wavelength and provided with a plurality of parallel, resonant slots extending in one of said coordinate directions; means for projecting a focused electron beam, of a transverse area corresponding to said extended surface area, closely adjacent said surface in the other of said coordinate directions to generate electromagnetic energy, coherently radiated from said surface along an axis perpendicular to said one coordinate direction and canted to said other coordinate direction, of a frequency corresponding to said predetermined wavelength; and means including an optical system in juxtaposition with said extended surface and substantially concentric with said canted axis for focusing said coherently radiated energy to a distant area small relative to said extended surface area.

2. An electromagnetic wave generator in accordance with claim 1, in which said optical system comprises a lens having a partially reflecting surface transverse to said canted axis for increasing the amplitude of said radiated energy.

3. An electromagnetic wave generator according to claim 1, in which said conductive element is of cylindrical configuration with said resonant slots in the outer surface thereof, said focused electron beam is of hollow configuration encompassing said cylindrical element, and said optical system includes a toroidal lens system.

4. An electromagnetic wave generator according to claim 3, in which said toroidal lens system is adjustable.

5. An electromagnetic wave generator according to claim 3, in which said toroidal lens system includes a prismatic element for refracting said coherently radiated energy towards said other coordinate direction.

6. An electromagnetic wave generator according to claim 3, in which said cylindrical conductive element is hollow.

7. An electromagnetic wave generator according to claim 6, comprising optical means mounted on said cylindrical conductive element for sighting said generator.

8. An electromagnetic wave generator according to claim 1, in which said resonant slots are formed as cavities in said extended surface of said conductive element.

9. An electromagnetic wave generator according to claim 1, in which said resonant slots consist of the surface lines of a diffraction grating.

References Cited in the file of this patent

UNITED STATES PATENTS

| 2,435,804 | Spooner | Feb. 10, 1948 |
| 2,634,372 | Salisbury | Apr. 7, 1953 |
| 2,797,355 | DeVries et al. | June 25, 1957 |

FOREIGN PATENTS

| 691,900 | Great Britain | May 20, 1953 |